Figure 1:
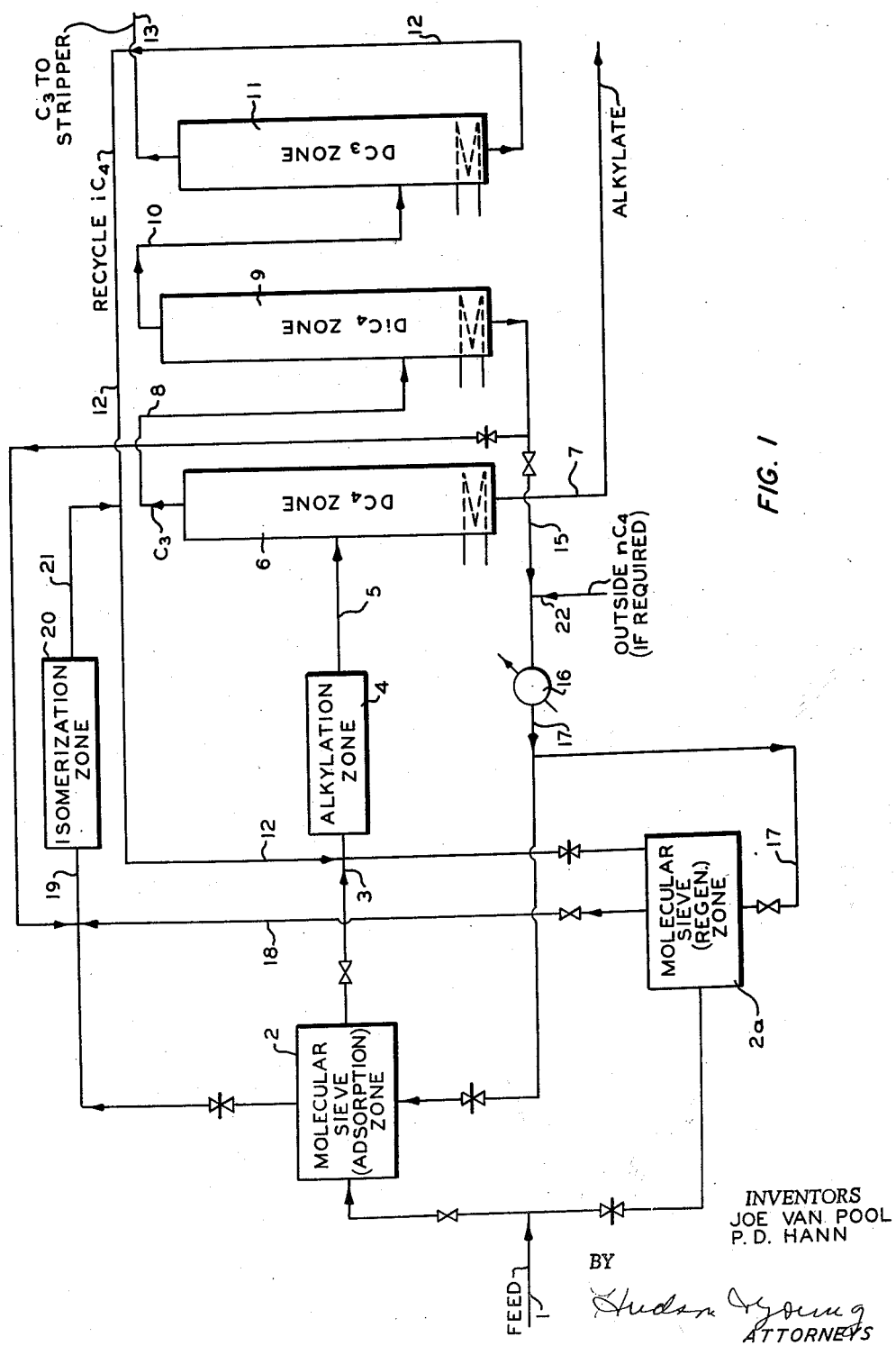

INVENTORS
JOE VAN POOL
P. D. HANN
BY
*Hudson Young*
ATTORNEYS

3,078,321
ALKYLATION OF HYDROCARBONS
Joe Van Pool and Paul D. Hann, Bartlesville, Okla., assignors to Phillips Petroleum Company, a corporation of Delaware
Filed Oct. 12, 1959, Ser. No. 845,966
5 Claims. (Cl. 260—683.49)

This invention relates to the alkylation of hydrocarbons. In one of its aspects, the invention relates to the alkylation of normal and branched-chain paraffins and normal and branched-chain olefins by resolving a mixture thereof employing molecular sieve into a stream containing branched-chain compounds which are alkylated at conditions optimum for their alkylation, recovering from the sieve straight-chain compounds using a straight-chain paraffin from the process and subjecting said compounds to isomerization to form additional branched-chain compounds which are passed to alkylation. In another of its aspects, the invention relates to a process as described with the modification that the recovered straight-chain compounds are sent directly to alkylation rather than to isomerization, the alkylation in this instance being one conducted separately from the alkylation of the branched-chain compounds.

A large part of the cost in the preparation of synthetic fuels by way of alkylation is found in the expensive character of the complex distillation or fractionation apparatus which is employed. We have conceived the combination of related steps in which use is made of molecular sieve segregation of reactants as herein described to produce branched-chain compounds which are optimally alkylated and straight-chain compounds are either isomerized and alkylated in the same alkylation zone or separately alkylated also under optimum conditions.

It is an object of this invention to alkylate hydrocarbons. It is another object of this invention to optimally alkylate branched-chain paraffin and branched-chain olefin hydrocarbons. A further object of this invention is to economically segregate straight-chain paraffin and straight-chain olefin hydrocarbons in an alkylation operation avoiding a substantial portion of the cost of distillation equipment. It is a still further object of this invention to so combine a molecular sieve separation of straight-chain from branched-chain hydrocarbons in an alkylation operation that the eluent for the removal of adsorbed straight-chain hydrocarbons is furnished by the alkylation operation.

Other aspects, objects, and the several advantages of this invention are apparent from a study of the disclosure, the drawings, and the appended claims.

The invention will now be set forth and described more fully using for purposes of illustration a feed mixture essentially containing n-butane, n-butylene, isobutane and isobutylene.

According to the present invention a stream containing the just mentioned hydrocarbons is contacted with a molecular sieve under conditions to substantially adsorb therefrom the straight-chain hydrocarbons yielding a stream of branched-chain paraffin and branched-chain olefin hydrocarbon which is subjected to alkylation yielding an alkylate and a normal paraffin which is used to recover from the sieve the thereon adsorbed straight-chain paraffin-olefin; in one form of the invention, the desorbed straight-chain compounds being isomerized to form additional branched-chain paraffin and olefin which are sent to alkylation; and in another form of the invention, the recovered straight-chain hydrocarbons being subjected to separate alkylation under conditions especially suited to their alkylation.

By combining, as herein set forth, a molecular sieve operation with an alkylation product distillation operation, there is a considerable saving in original cost and in subsequent operation of equipment required as will appear to one skilled in the art who has studied this disclosure. Thus, in the first form of the invention in which isomerization is effected, no distillation equipment is required to separate straight-chain paraffin and straight-chain olefin hydrocarbons from branched-chain paraffin and branched-chain olefin hydrocarbons and in the last described form of the invention, alkylate products of different qualities are prepared utilizing a common deisobutanizer-depropanizer stripper train for both alkylations, each of which, however, possesses its own alkylate debutanizer distillation column, resulting in greater savings.

Figure 2:
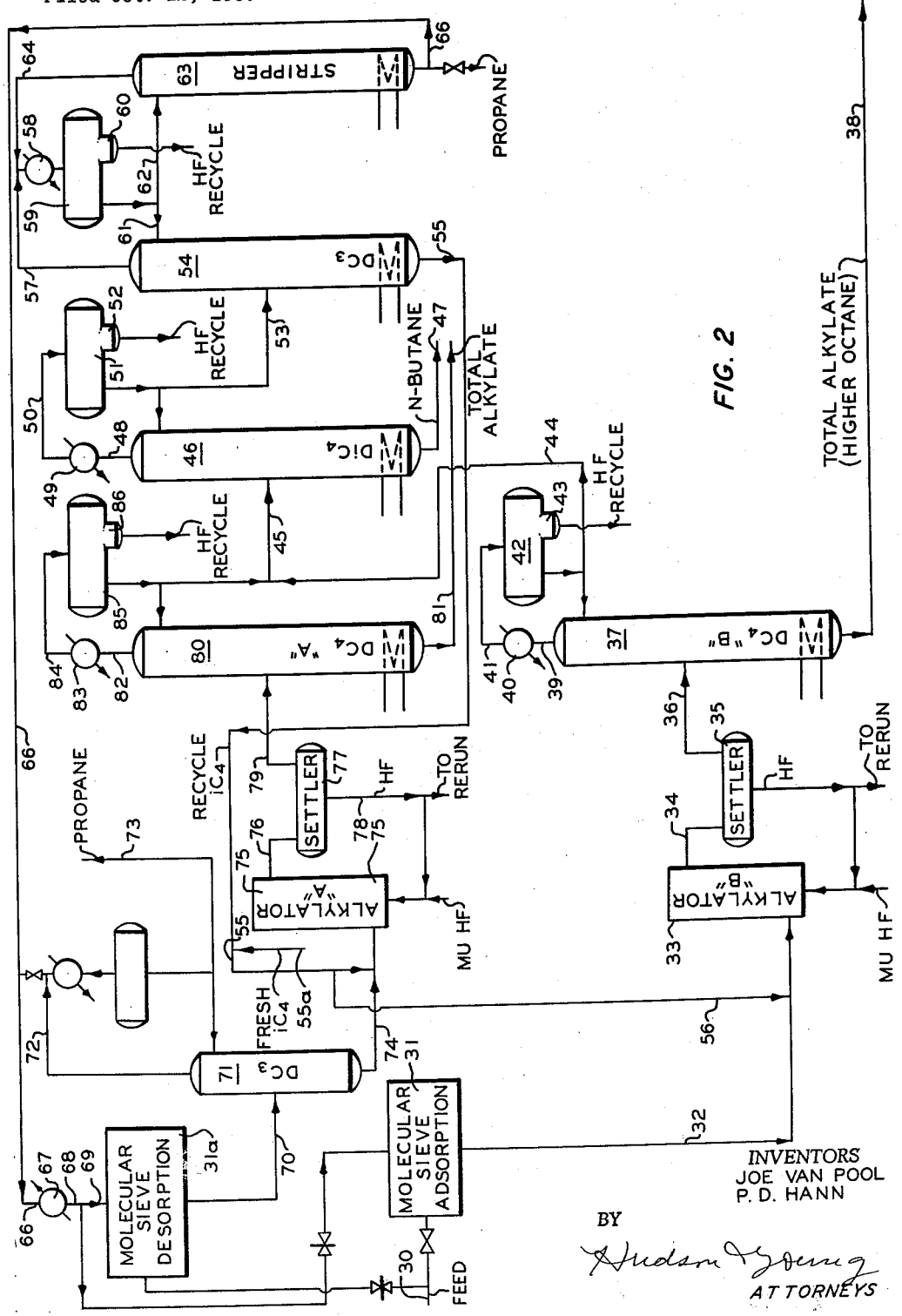

Referring now to the drawing, in FIGURE 1 there is shown an operation in which a molecular sieve is employed to separate normal paraffin and normal olefin on the one hand from isoparaffin and isoolefin on the other, the normal compounds being adsorbed on the sieve and the isomers going through for subsequent alkylation from which normal paraffin compound is obtained and used as eluent to recover the normal paraffin and normal olefin from the sieve following which the thus-recovered stream is passed to isomerization yielding additional isoparaffin and isoolefin for alkylation in said alkylation zone. FIGURE 2 shows a form of the invention in which molecular sieve is again used to separate normal- and iso- paraffins and olefins. However, in FIGURE 2 there is no isomerization but rather there is a separate alkylation upon the normal paraffin and normal olefin recovered from the molecular sieve selective adsorption separation of the normal compounds from the iso compounds.

It will be understood by one skilled in the art in possession of this disclosure, having studied the same, that the combination of steps which are set forth herein and which are now to be described using a stream containing n-butane-n-butylene and isobutylene-isobutene by way of example possess application to other streams as well.

Referring now to FIGURE 1, a feed containing n-butane, n-butylene, isobutane, and isobutylene is passed by way of pipe 1 into molecular sieve material containing adsorption zone 2. The molecular sieves are well known in the art, for example, Linde Molecular Sieve 5A, which is applicable here is well known as a zeolite type calcium alumino silicate. Since it is described in literature it need not be here further described. In zone 2 the normal compounds are adsorbed and there is obtained from zone 2 and passed by way of pipe 3 to alkylation zone 4 a stream containing substantial amounts of isobutane and isobutylene which are there alkylated, forming alkylate effluent obtained by way of pipe 5 which is debutanized in debutanizer 6, yielding alkylate by way of pipe 7. Overhead from zone 6 contains essentially n-butane, isobutane, and propane and is taken by way of pipe 8 to deisobutanizer 9, overhead from which passes by way of pipe 10 to depropanizing zone 11 in which the isobutane is depropanized and recovered and recycled by way of pipe 12 and pipe 3 for further alkylation in zone 4. Overhead from zone 11 is taken off by way of pipe 13 and constitutes propane. Normal butane is removed from deisobutanizer 9 by way of pipe 15, heated in heater 16, passed by way of pipe 17 into molecular sieve zone 2a which is on regeneration and wherein the heated n-butane will remove from the sieve earlier used, as described in connection with zone 2, the therein adsorbed straight-chain compounds, that is, n-butane and n-butylene, which are then passed together with the n-butane by way of pipe 18 and pipe 19 to isomerizing zone 20 wherein isobutane and isobutylene as well as butene-2 from butene-1 are formed and passed by way of pipes 21, 12 and 3 into alkylation zone 4. It will be noted that two molecular sieve zones are shown to permit extended continuous operation and that suitable pipes and valving to operate one zone on adsorption while the other is on desorption are indicated.

The n-butane is heated in heater 16 to a temperature of 550° F. to facilitate stripping of the sieve, as described, to obtain the straight-chain compounds which are passed to zone 20. When operating above about 550° F., no outside normal butane 22 is usually required. At below about 550° F., depending on the normal butane content of the feed, additional or outside normal butane can be used to increase the quantity of eluent used.

The sieve regeneration can be carried out between about 250–650° F., depending on the percentage removal of absorbed materials desired. Of course, at higher temperature less eluent is needed for a given percentage removal of adsorbed components from the sieve.

Referring now to FIGURE 2, a feed containing n-butane, n-butylene, isobutane, and isobutylene is passed by way of pipe 30 to molecular sieve adsorption zone 31 from which isobutane and isobutylene are obtained as stream 32 passing to alkylation zone 33. Alkylate formed passes by way of pipe 34, HF acid catalyst settler 35 and pipe 36 into alkylate debutanizing tower 37, bottoms from which constitute debutanized alkylate passed to storage by pipe 38. Overhead from 37 passes by way of pipe 39, cooler condenser 40, and pipe 41 into accumulator settler 42. Acid which settles at the bottom of keg 43 can be recycled according to the method for reuse. Overhead not used as reflux is passed by pipe 44 to pipe 45 and then to deisobutanizing operation 46. Bottoms 47 from this operation constitute essentially n-butane withdrawn to storage while overhead 48 passes through cooler condenser 49 and pipe 50 to accumulator settler 51, settling HF acid catalyst in keg 52 for recycle, etc. Isobutane containing propane is taken from accumulator 51 and passed by way of pipe 53 to depropanizer 54, bottoms from which constitute isobutane, which is recycled at least in part by way of pipes 55 and 56 to pipe 32 for use in accumulator 33 and partly to another alkylation, as later described. Overhead 57 from depropanizer tower 54 is taken off through cooler condenser 58 into accumulator 59. HF acid catalyst is removed from keg 60 and recycled. A portion of the liquid in accumulator 59 is recycled by way of pipe 61 as reflux for tower 54 and the remainder is passed by way of pipe 62 to propane stripper 63. Hydrogen fluoride is taken overhead by way of pipe 64 and ultimately recovered for recycle by way of keg 60. Propane is withdrawn from stripper 63 by pipe 66, heated in heater 67 and passed by way of pipe 68 and pipe 69 to molecular sieve 31a which is on desorption cycle to desorb therefrom n-butane and n-butylene, the combined stream passing by way of pipe 70 to depropanizer 71. Overhead 72 which is propane can be passed at least in part to pipe 66 and is in part removed from the operation by way of pipe 73. Bottoms constitute a stream essentially containing n-butane and n-butylene and is passed by way of pipe 74 to alkylation zone 75. Alkylated effluent removed from zone 75 is passed by way of pipe 76 to settler 77, wherein acid is removed by pipe 78, and the hydrocarbon phase is passed through pipe 79 to debutanizer 80 wherein the normal butane and lighter components are separated from the alkylate formed in zone 75 and the alkylate is recovered by way of pipe 81 and sent to storage. Overhead which contains butane, isobutane, propane and lighter passes by way of pipe 82, cooler condenser 83, and pipe 84 into accumulator 85 from which acid is removed at keg 86 and the remainder of the contents of accumulator 85 is eventually passed by way of pipe 45 together with the overhead from debutanizer 37 into common deisobutanizer 46, the overhead from zone 37 passing by way of pipe 44 into pipe 45 just ahead of deisobutanizer 46.

The following are tabular data relating to the operation of FIGURES 1 and 2. Considering the data, it will be obvious to one skilled in the art in possession of this disclosure and having studied the same that conditions for the alkylation of an isoparaffin with an isoolefin and the conditions for alkylation of isoparaffin with normal olefin are known and that the invention here sought to be protected is based upon the primary concept of the combination of steps, in each of which the general conditions can be routinely determined by one in possession of this disclosure.

SPECIFIC EXAMPLES

Operating Conditions:
    Alkylation zone 4—
        Temperature,[1] ° F. ------------------ 85
        Acid to hydrocarbon weight ratio-------- 1:1
        Isobutane to olefin volume ratio-------- 10:1
        Pressure to maintain liquid phase.
        Contact time,[3] minutes--------------- 2
    Alkylation zone 33—
        Temperature,[1] ° F. ------------------ 85
        Acid to hydrocarbon weight ratio-------- 1:1
        Isobutane to olefin volume ratio-------- 10:1
        Pressure to maintain liquid phase.
        Contact time,[3] minutes--------------- 1
    Alkylation zone 75—
        Temperature,[1] ° F. ------------------ 100
        Acid to hydrocarbon weight ratio-------- 1:1
        Isobutane to olefin volume ratio-------- 10:1
        Pressure to maintain liquid phase.
        Contact time,[3] minutes --------------- 2
    Conventional alkylation:
        Temperature,[1] ° F. ------------------ 90
        Acid to hydrocarbon weight ratio-------- 1:1
        Isobutane to olefin volume ratio-------- 10:1
        Pressure to maintain liquid phase.
        Contact time,[3] minutes --------------- 2
    Molecular sieve zones—
        Adsorption—
            Pressure, p.s.i.g----------------- 100
            Temperature, ° F---------------- 90
        Regeneration—
            Pressure, p.s.i.g----------------- 50
            Temperature, ° F---------------- ([4])([5])

[1] Temperature for optimum octane.
[2] As cold as cooling facilities will allow.
[3] Contact time for optimum octane.
[4] 550° F. for operation of FIGURE 1.
[5] 350° F. for operation of FIGURE 2.

Tabulation (FIG. 1)

| Component, bbl./hr. | Feed (1) | Sieve effluent (3) | Eluent for sieve (17) | Outside normal butane (22) | Isom. effluent (21) | Recycle isobutane (12) | Charge to alkylation | Alkylation effluent (5) | Propane yield (13) |
|---|---|---|---|---|---|---|---|---|---|
| Propane | 10.0 | 2.0 | | | 8.0 | 25.0 | 35.0 | 35.0 | 10 |
| Isobutane | 26.0 | 25.0 | .4 | | 39.0 | 436.0 | 500.0 | 440.0 | |
| Normal butane | 14.0 | 2.8 | 56.8 | 20.0 | 34.0 | 46.6 | 83.4 | 83.4 | |
| Isobutylene | 30.0 | 28.0 | | | 2.2 | | 30.2 | | |
| Butene-1 | 12.0 | 1.0 | | | 5.3 | | 6.3 | | |
| Butene-2 | 8.0 | 1.0 | | | 12.5 | | 13.5 | | |
| Alkylate | | | | | | | | ¹ 90.0 | |
| Total | 100.0 | 59.8 | ² 60.8 | 20.0 | 101.0 | 507.6 | 668.4 | 648.4 | 10 |

¹ R.O.N. w./3 cc. TEL of 108.2, 90 b./h.
² Ratio of eluent to adsorbate of 1.5 to 1; eluent at 550° F.

Zone 20, conventional to our invention, comprises separation of olefins from paraffins in accordance with Serial Number 746,811, filed July 7, 1958, and now abandoned, Joe Van Pool, inventor; isomerization of olefins, butene-1 to butene-2, in accordance with 2,353,552, issued July 11, 1944, Harry E. Drennen, inventor; isomerization of olefins, butene-1 to isobutylene, in accordance with 2,395,274, issued February 19, 1946, John C. Hillyer et al., inventors; and isomerization of the normal paraffins, normal butane to isobutane, using the conventional hydrogen chloride activated aluminum chloride as is known to those skilled in the art; temperature of 225° F., and pressure 400 p.s.i.g.

recovering from the effluent of the alkylation zone an alkylate and a straight-chain saturated hydrocarbon, using the straight-chain hydrocarbon as eluent to recover the straight-chain hydrocarbons from the molecule sieve, and ultimately alkylating said straight-chain hydrocarbons apart from the alkylation of said branched-chain hydrocarbons; that a stream containing said straight- and branched-chain hydrocarbons are passed into a molecular sieve as before but with the modification that the straight-chain hydrocarbons recovered from the molecular sieve employing saturated straight-chain hydrocarbons are passed to an isomerization zone forming additional

Tabulation (FIG. 2)

| Component, b/h. | Feed (30) | Sieve effluent (32) | Isobutane recycle (56) | Charge to alkylator unit (33) | Alkylation effluent (36) | Eluent for sieve (69) | Charge to unit (71) | Propane yield (73) | Isobutane recycle (55) | Fresh isobutane (55a) | Charge to alkylator unit (75) | Alkylation effluent (79) |
|---|---|---|---|---|---|---|---|---|---|---|---|---|
| Propane | 10.0 | 2.0 | 15.7 | 17.7 | 17.7 | 100.0 | 108.0 | 10.0 | 9.3 | | 17.3 | 17.3 |
| Isobutane | 26.0 | 25.0 | 275.0 | 300.0 | 264.0 | | 1.0 | | 165.0 | 34.0 | 200.0 | 176.0 |
| Normal Butane | 14.0 | 2.8 | 29.4 | 32.2 | 32.2 | | 11.2 | | 17.5 | | 28.7 | 28.7 |
| Isobutylene | 30.0 | 28.0 | | 28.0 | | | 2.0 | | | | 2.0 | |
| Butene-1 | 12.0 | 1.0 | | 1.0 | | | 11.0 | | | | 11.0 | |
| Butene-2 | 8.0 | 1.0 | | 1.0 | | | 7.0 | | | | 7.0 | |
| Alkylate | | | | | ² 54.0 | | | | | | | ³ 36.0 |
| Total | 100.0 | 59.8 | 320.1 | 379.9 | 367.9 | ¹ 100.0 | 140.2 | 10.0 | 191.8 | 34.0 | 266.0 | 258.0 |

¹ Ratio of eluent to adsorbate of 2.5 to 1; eluent at 350° F.
² R.O.N. w./3 cc. TEL of 109.2; 54.0 b./h.
³ R.O.N. w./3 cc. TEL of 103.5; 36.0 b./h.

When operating with the same feed as in the tables (that is, line 1 or line 30) under conventional conditions, the same quantity of alkylate is produced as that produced in either process of the invention as illustrated in FIGURES 1 and 2. However, since the feed contains component olefins that should be alkylated at different conditions of time and temperature, the conventional conditions cannot be optimum for all the components. The alkylate produced conventionally has an RON k./3 cc. TEL of only 103.9. By our invention, as illustrated by FIGURE 1, the octane of this same quantity of alkylate is 108.2; by our invention, as illustrated by FIGURE 2, the octane of this same quantity of total alkylate is 106.9. The above illustrates the octane improvement when operating in accordance with our invention as compared to the conventional operation.

Reasonable variation and modification are possible within the scope of the foregoing disclosure, the drawings, and the appended claims to the invention the essence of which is that a stream containing straight-chain paraffin and straight-chain olefin hydrocarbons and branched-chain paraffin and branched-chain olefin hydrocarbons is subjected to selective adsorption in a molecular sieve containing zone wherein the straight chain-hydrocarbons are adsorbed, permitting the branched-chain hydrocarbons to pass through substantially unabsorbed, passing the branched-chain hydrocarbons to an alkylation zone, branched-chain hydrocarbons which are passed to the alkylation zone.

We claim:

1. A method for the alkylation of hydrocarbons which comprises feeding a stream containing a straight-chain paraffin, a straight-chain olefin, a branched-chain paraffin, and a branched-chain olefin into a molecular sieve material resulting in the selective adsorption of the straight-chain hydrocarbons and a stream containing the branched-chain hydrocarbons, causing alkylation of the last mentioned stream forming an alkylation effluent, separating said effluent into an alkylate containing stream and a straight-chain paraffin containing stream, recovering alkylate from said alkylate-containing stream, recovering straight-chain paraffin from said straight-chain paraffin containing stream, and passing said straight-chain paraffin through said sieve material to recover therefrom the straight-chain paraffin and straight-chain olefin, and subjecting said straight-chain paraffin and straight-chain olefin to further treatment including an alkylation in which a branched-chain paraffin is alkylated with an olefin.

2. A method according to claim 1 wherein the straight-chain paraffin and straight-chain olefin containing stream is alkylated separately from the branched-chain paraffin and branched-chain olefin containing stream in an alkylation in which a branched-chain paraffin is alkylated with an olefin.

3. A method for the alkylation of hydrocarbons which comprises feeding a stream containing normal butane, normal butylene, isobutane, and isobutylene into a molecular sieve material resulting in the selective adsorption of the straight-chain compounds and a stream containing the branched-chain compounds, alkylating the branched-chain compounds, thereby forming a stream containing an alkylate and propane, recovering said alkylate, recovering said propane, passing said propane through said sieve material thus desorbing the straight-chain compounds therefrom, thereby forming a stream containing said straight-chain compounds and propane, depropanizing the last mentioned stream and passing the depropanized stream to an alkylation in which a branched-chain paraffin is alkylated with an olefin which is an alkylation apart from the alkylation of the branched-chain compounds thus producing additional alkylate 4. A method for the alkylation of hydrocarbons which comprises feeding a stream containing a straight-chain paraffin, a straight-chain olefin, a branched-chain paraffin and a branched-chain olefin into a molecular sieve material resulting in the selective adsorption of the straight-chain paraffin and straight-chain olefin and a stream of branched-chain paraffin and branched-chain olefin; causing alkylation of the branched-chain paraffin and branched-chain olefin containing stream; recovering alkylate from the alkylated stream; recovering straight-chain paraffin from the alkylated stream; passing straight-chain paraffin through said sieve material to desorb therefrom the straight-chain paraffin and straight-chain olefin passing the thus obtained straight-chain paraffin and straight-chain olefin containing stream to an isomerization zone; therein isomerizing said stream to form a stream containing additional branch-chain paraffin and branched-chain olefin; and passing the additional branched-chain paraffin and branched-chain olefin containing stream to alkylation.

5. A method for the alkylation of hydrocarbons which comprises feeding a stream containing normal butane, normal butylene, isobutane and isobutylene into a molecular sieve material, resulting in the selective adsorption of normal butane and normal butylene on the sieve and a stream of isobutane and isobutylene; causing the alkylation of the isobutane and isobutylene stream; recovering alkylate from the alkylated stream; recovering normal butane from the alkylated stream; passing normal butane through said sieve material to desorb therefrom the normal butane and normal butylene; passing the thus obtained normal butane and normal butylene containing stream to an isomerization zone; therein isomerizing said stream to form a stream containing additional isobutane and isobutylene; and passing the additional isobutane and isobutylene containing stream to alkylation.

References Cited in the file of this patent
UNITED STATES PATENTS

| | | |
|---|---|---|
| 2,293,705 | Bloch | Aug. 25, 1942 |
| 2,311,096 | Strawn | Feb. 16, 1943 |
| 2,427,293 | Matuszak | Sept. 9, 1947 |
| 2,894,998 | Hess et al. | July 14, 1959 |
| 2,914,591 | Brown | Nov. 24, 1959 |
| 2,935,543 | Smith | May 3, 1960 |